US010127376B1

(12) United States Patent
Robinson (10) Patent No.: US 10,127,376 B1
(45) Date of Patent: Nov. 13, 2018

(54) GRAPHICAL PASSWORD GENERATION (71) Applicant: EMC Corporation, Hopkinton, MA (US)

(72) Inventor: Peter A. Robinson, Enoggera Reservoir (AU)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/587,187

(22) Filed: Dec. 31, 2014

(51) Int. Cl.
*G06F 7/04* (2006.01)
*G06F 21/45* (2013.01)
*G06F 21/36* (2013.01)

(52) U.S. Cl.
CPC ............. *G06F 21/45* (2013.01); *G06F 21/36* (2013.01)

(58) Field of Classification Search
CPC ...... G06F 21/46; G06F 17/3025; G06F 21/31; G06F 21/36; H04L 29/06782
USPC ............................................................ 726/6
See application file for complete search history.

(56) References Cited

U.S. PATENT DOCUMENTS

| | | | | | |
|---|---|---|---|---|---|
| 8,065,525 | B2 * | 11/2011 | Zilberman | ............ | G06F 21/316 713/176 |
| RE44,725 | E * | 1/2014 | Holt | ........................ | G06F 21/36 713/182 |
| 8,694,791 | B1 * | 4/2014 | Rohrweck | ............... | G06F 21/36 455/418 |
| 2004/0034801 | A1 * | 2/2004 | Jaeger | ................... | G06F 3/0481 726/6 |
| 2004/0230843 | A1 * | 11/2004 | Jansen | .................... | G06F 21/36 726/7 |
| 2005/0015604 | A1 * | 1/2005 | Sundararajan | .......... | G06F 21/35 713/184 |
| 2006/0104446 | A1 * | 5/2006 | Varghese | ................ | G06F 21/36 380/255 |
| 2007/0074119 | A1 * | 3/2007 | Komine | ............. | G06Q 20/3674 715/743 |
| 2008/0016369 | A1 * | 1/2008 | Kirovski | ................ | G06F 21/36 713/184 |
| 2008/0022111 | A1 * | 1/2008 | Dietl | ....................... | G06F 21/64 713/176 |
| 2009/0165104 | A1 * | 6/2009 | Danielsen | .............. | G06F 21/41 726/6 |
| 2009/0243970 | A1 * | 10/2009 | Kato | ................... | G02B 27/0176 345/8 |

(Continued)

OTHER PUBLICATIONS

Anuar et al, Educating Users to Generate Secure Graphical Password Secrets: An Initial Study, 2013, IEEE, pp. 26-31.*

(Continued)

*Primary Examiner* — Luu T Pham
*Assistant Examiner* — Jenise E Jackson
(74) *Attorney, Agent, or Firm* — Krishnendu Gupta (57) ABSTRACT

There is disclosed herein techniques for use in authentication. The techniques comprise providing multiple selectable image portions. The techniques also comprise selecting a first image portion of the multiple selectable image portions. The said selecting of the first image portion comprises performing a first operation to associate a first marking with the first image portion in an identifiable manner. The techniques further comprise generating information for use in authentication based on the first image portion and the first marking associated with the first image portion.

9 Claims, 4 Drawing Sheets

(56) References Cited

U.S. PATENT DOCUMENTS

| | | | | |
|---|---|---|---|---|
| 2009/0245512 A1* | 10/2009 | Masui | G09C 5/00 380/54 |
| 2010/0186074 A1* | 7/2010 | Stavrou | G06F 21/36 726/7 |
| 2011/0055585 A1* | 3/2011 | Lee | H04L 9/0844 713/183 |
| 2012/0102551 A1* | 4/2012 | Bidare | G06F 21/36 726/4 |
| 2012/0306914 A1* | 12/2012 | Sepulveda | G06T 15/50 345/629 |
| 2013/0268775 A1* | 10/2013 | Hawkins | G06F 21/64 713/189 |
| 2013/0332747 A1* | 12/2013 | Roberts | G06F 21/602 713/192 |
| 2014/0016039 A1* | 1/2014 | Ayatsuka | H04L 41/12 348/706 |
| 2014/0189885 A1* | 7/2014 | Golan | G06F 21/32 726/28 |
| 2015/0095826 A1* | 4/2015 | Ahn | G06F 3/0488 715/769 |
| 2015/0295958 A1* | 10/2015 | Ayatsuka | H04L 41/12 709/227 |
| 2015/0301724 A1* | 10/2015 | Thibadeau, Sr. | G06F 3/04842 706/12 |

OTHER PUBLICATIONS

Oorschot et al, Purely Automated Attacks on Pass Points-Style Graphical Passwords, 2010, IEEE, pp. 393-405.*

* cited by examiner

GRAPHICAL PASSWORD GENERATION

TECHNICAL FIELD

The present invention relates generally to the field of authentication. More specifically, the invention relates to a method, an apparatus and a computer program product for use in graphical password generation.

BACKGROUND OF THE INVENTION

In order to gain access to protected resources, users are often required to enter passwords in order to prove their identity. Different applications, accounts or other types of protected resources associated with a given user may each require entry of a distinct password, thereby necessitating that the user remember multiple such passwords in order to access the corresponding resources.

An alphanumeric password is often entered using a keyboard of a computer, mobile telephone or other type of processing device. Due to the large number of keys on a typical keyboard, the number of possible combinations is virtually endless, leading to high theoretical entropy. In practice, however, it will be understood that the higher the theoretical entropy, the greater the possibility that the user will forget their password, particularly if the user is burdened with having to remember multiple passwords. As will be readily appreciated, once the password is forgotten, it will be necessary for the user to contact the organization responsible for the password in order to have the password reset. This is inconvenient for both the user and the organization responsible for the reset.

To reduce the number of subsequent password resets, while at the same time not sacrificing security, the organization creating the password may attempt to simplify the new password in order to make the password easier for the user to remember. For instance, a bank may computer generate a four digit PIN for use with a credit card (e.g., 4738). Typically, if the user forgets the PIN once, the user will get a new PIN. If they forget the PIN again, the bank may generate a simpler PIN (e.g., 1122, 1234, etc) to make it easier for the user to remember the password.

Although graphical passwords are also known, conventional graphical passwords can also be very difficult to remember. Similar to alphanumeric password, this can lead to multiple password resets, which in turn can inconvenience the user and the organization responsible for the reset.

Accordingly, a need exists for techniques that reduce the amount of password resets in connection with graphical passwords.

SUMMARY OF THE INVENTION

There is disclosed a method, comprising: providing multiple selectable image portions; selecting a first image portion of the multiple selectable image portions, wherein the said selecting of the first image portion comprises performing a first operation to associate a first marking with the first image portion in an identifiable manner; and based on the first image portion and the first marking associated with the first image portion, generating information for use in authentication.

There is also disclosed an apparatus, comprising: at least one processing device, said at least one processing device comprising a processor coupled to a memory; wherein the apparatus is configured to: provide multiple selectable image portions; select a first image portion of the multiple selectable image portions, wherein the said selecting of the first image portion comprises performing a first operation to associate a first marking with the first image portion in an identifiable manner; and based on the first image portion and the first marking associated with the first image portion, generate information for use in authentication.

There is further disclosed a computer program product having a non-transitory computer-readable medium storing instructions, the instructions, when carried out by one or more processors, causing the one or more processors to perform a method of:

providing multiple selectable image portions; selecting a first image portion of the multiple selectable image portions, wherein the said selecting of the first image portion comprises performing a first operation to associate a first marking with the first image portion in an identifiable manner; and based on the first image portion and the first marking associated with the first image portion, generating information for use in authentication.

BRIEF DESCRIPTION OF THE DRAWINGS

The invention will be more clearly understood from the following description of preferred embodiments thereof, which are given by way of examples only, with reference to the accompanying drawings, in which.

DETAILED DESCRIPTION

Figure 1:
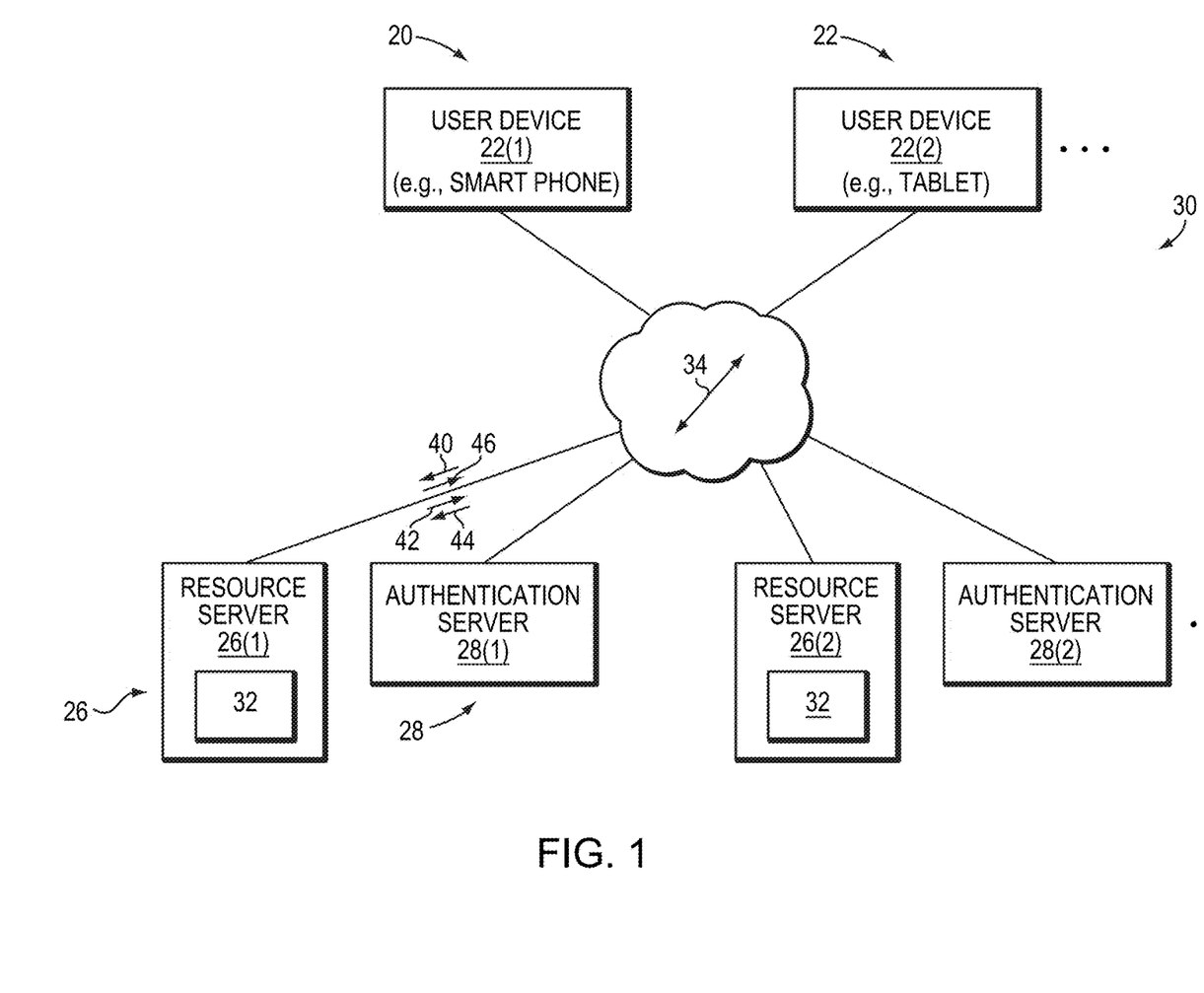
FIG. 1 shows an environment configured to generate authentication information in accordance with an embodiment of the invention.

FIG. 1 shows an environment 20 configured to generate authentication information in accordance with an embodiment of the invention. The environment 20 includes user devices 22(1), 22(2), . . . (collectively, user devices 22), resource servers 26(1), 26(2), . . . (collectively, resource servers 26), authentication servers 28(1), 28(2), . . . (collectively, authentication servers 28), and communications medium 30.

The user devices 22 are constructed and arranged to communicate with the resource servers 26 over the communications medium 30. Specifically, each user device 22 is an electronic apparatus through which a user (not shown) is able to communicate with the resource servers 26. Examples of suitable electronic apparatus for the user devices 22 include general purpose computers, laptop computers, smart phones, tablets, and so on.

The resource servers 26 are constructed and arranged to provide access to protected resources 32 following successful user authentication. Examples of suitable resource servers 26 include content servers, gateways, financial institutions, online stores, other transaction servers, etc.

The authentication servers 28 are constructed and arranged to perform authentication operations to authenticate users of the user devices 22. Further, each authentication server 28 is constructed and arranged to generate graphical passwords for use in the authentication operations. For example, the authentication server 28 may generate a graphical password that is communicated to a user. The same user may subsequently enter the graphical password at the user device 22 to authenticate and obtain access to resource 32.

The communications medium 30 is constructed and arranged to connect the various components of the environment 20 together to enable these components to exchange electronic signals 34 (e.g., see the double arrow 34). At least a portion of the communications medium 30 is illustrated as a cloud to indicate that the communications medium 30 is capable of having a variety of different topologies including backbone, hub-and-spoke, loop, irregular, combinations thereof, and so on. Along these lines, the communications medium 30 may include copper-based data communications devices and cabling, fiber optic devices and cabling, wireless devices, combinations thereof, etc. Furthermore, the communications medium 30 is capable of supporting LAN-based communications, SAN-based communications, cellular communications, combinations thereof, etc.

During operation, the user initially enrolls with the resource server 26 by providing personal identifiable information as well as requesting a password for use in authentication. The resource server 26 responds to the enrollment by requesting the authentication server 28 to generate a suitable password for the user. The authentication server 28 in turn generates a graphical password that is communicated to the user. The authentication server 28 also stores the generated graphical password for use in future authentication operations.

Upon receipt of the generated graphical password, the user may attempt to login by providing a login request 40 using the user device 22. The login request 40 may include identification information entered by the user as well as the graphical password. The resource server 26 receives the login request 40 and sends a request transmission 42 through the communications medium 30 to the authentication server 28 directing the authentication server 28 to perform an authentication operation.

Next, the authentication server 28 performs the authentication operation by comparing, among other things, the submitted graphical password with the stored graphical password. The authentication server 28 then returns a response transmission 44 to the resource server 26 through the communications medium 30. The response transmission 44 indicates whether the resource server 26 should grant or deny access to the protected resource 32. The resource server 26 then sends a login response 46 back to the user device 22 either allowing or disallowing access. Further details will now be provided with reference to FIG. 2.

Figure 2:
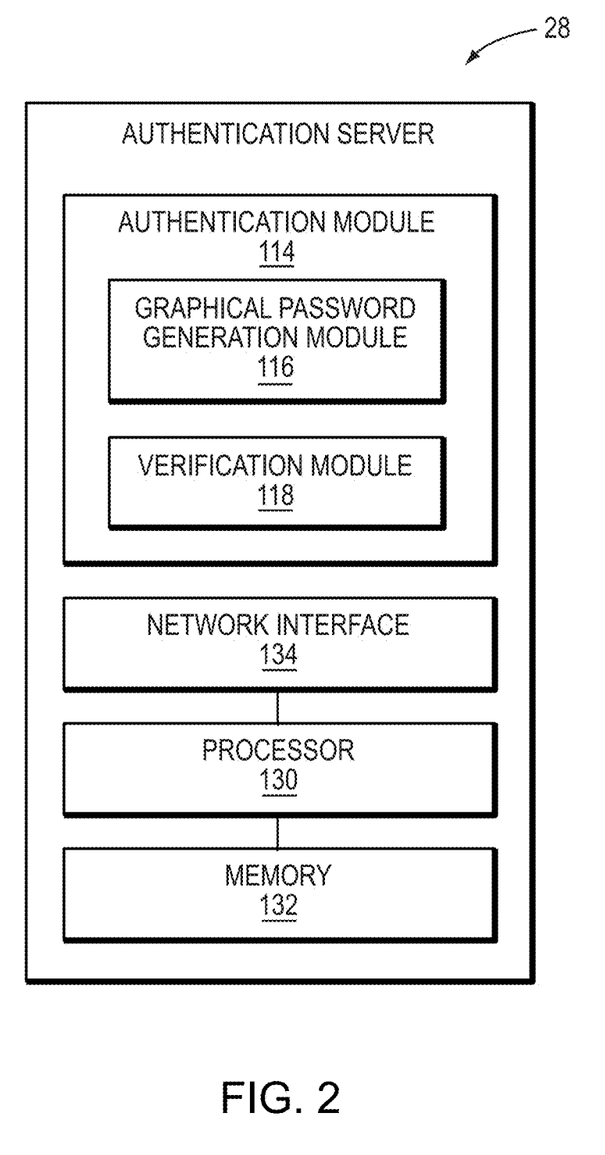
FIG. 2 shows an exemplary authentication server utilized in the environment of FIG. 1.

FIG. 2 shows in more detail the authentication server 28 of the environment 20 of FIG. 1. The authentication server 28 comprises a processor 130 coupled to a memory 132 and a network interface 134. The authentication server 28 also comprises an authentication module 114 that includes a graphical password generation module 116 and a verification module 118. It should be noted that at least portions of the authentication module 114 of the authentication server 28 may be implemented at least in part in the form of software that is stored in memory 132 and executed by processor 130.

The processor 130 comprises a microprocessor, a microcontroller, an application-specific integrated circuit (ASIC), a field-programmable gate array (FPGA) or other type of processing circuitry, as well as portions or combinations of such circuitry elements.

The memory 132 comprises random access memory (RAM), read-only memory (ROM) or other types of memory, in any combination. The memory 132 and other memories disclosed herein may be viewed as examples of what are more generally referred to as "processor-readable storage media" storing executable computer program code or other types of software programs.

The network interface 134 allows the authentication server 28 to communicate over the communications medium 30 with the user devices 22 and resource servers 26, and comprises one or more conventional transceivers.

As mentioned above, the authentication server 28 comprises the authentication module 114, which in turn includes the graphical password generation module 116 and the verification module 118, for facilitating generation of the graphical passwords and the performance of the authentication operations. Firstly, turning to the generation in more detail, the authentication server 28 generates the graphical password by providing multiple selectable image portions. For example, the authentication server 28 may retrieve an image from memory 132, and divide the image into multiple selectable image portions. As will be described in further detail below, a grid like structure may be used to divide the image into multiple selectable portions. The authentication server 28 then randomly selects one of the image portions and a first marking is associated to the first randomly selected image portion in an identifiable manner. For example, the first marking may have at least one identifiable characteristic with respect to the first image portion. Subsequently, after random selection of the first image portion, the authentication server 28 may perform a repeat of the selection step by associating at least one other marking to an image portion of the multiple selectable image portions. The at least one other marking being associated with its corresponding image portion in a similar manner as the first marking is associated to the first image potion. The authentication server 28 then generates a graphical password for use in authentication based on the selected image portions and their associated markings. Finally, the authentication server 28 stores the graphical password and communicates it to the user.

After the generated graphical password is communicated to the user, the user possesses the ability to access protected resource 32 associated with the resource server 26 by recreating the graphical password. In some embodiments, the user device 22 comprises a web browser for facilitating presentation of the image divided into multiple image portions that are selectable by the user. Thus, the user is presented with the image divided by a grid-like structure into multiple image portions, and the user must select the appropriate image portions, and apply or associate the appropriate markings to the image portions in order to create the correct graphical password. For example, the user may click on a start point and an end point in an image portion in order to draw a marking (e.g., line) between the two points. The authentication server 28 verifies the identity of the user by confirming that the submitted password as created by the user is correct.

An exemplary process 300 utilized in the environment 20 will now be described in more detail with reference to the flow diagram of FIG. 3. It is to be understood that this particular process 300 is exemplary only, and additional or alternative processes can be carried out in other embodiments.

In step 302, the authentication server 28 provides multiple selectable image portions. In one embodiment, a base image (person, scene, object, etc.) is obtained by retrieving from memory 132 an image that may initially have been submitted during enrollment. The authentication server 28 upon retrieving the image renders a set of gridlines over the base image that divides the base image into multiple image portions. These divided image portions are provided as selectable image portions by the authentication server 28. Other techniques can also be used for obtaining the base image, such as receiving an image from a camera or other image source that is implemented internally or externally to the authentication server 28.

In step 303, the authentication server 28 selects a first image portion from the multiple selectable image portions. The selection of the first image portion comprises performing a first operation to associate a first marking with the first image portion in an identifiable manner. For example, the selected image portion may be square in shape, and the operation may include inserting a line in the selected image portion such that the line extends diagonally between respective opposite angles of the image portion. In another example, the operation may include inserting a line in the selected image portion such that the line extends perpendicularly between two parallel sides of the square grid. Although, these are examples only, it is important that the first operation is performed in a manner that enables the first marking to have an identifiable characteristic with respect to the first image portion. In the said examples, the indefinable characteristic is the line extending diagonally or perpendicularly. However, there are numerous different approaches. In another example, the first operation associates the first marking with the first image portion by positioning the first marking such that the first marking is positioned in a defined area with respect to the first image portion. It may be that first marking is positioned in the left hand side or the right hand side of the image portion. Alternatively, in yet another example, the first operation is performed by positioning a coloured first marking, or applying a colour to the first marking, such that the coloured first marking is associated with the first image portion. Of course, the first marking may have a combination of any of the above identifiable characteristics with respect to the first image portions.

In step 304, the authentication server 28 generates information for use in authentication based on the first image portion and the first marking associated with the first image portion. It should be noted that the information characterizes the first image portion and the first marking associated with the first image portion. For example, the information may be used at least as a portion of a graphical password for use in authentication. As noted above, this graphical password is utilized to control access to the protected resource.

In use, the above steps 302, 303 and 304 are performed by the authentication server 28 as part of a graphical password generation process in which the generated information is stored as at least a portion of a graphical password. However, it should be appreciated that the above graphical password generation process is just one example embodiment. In another embodiment, the authentication server 28 selects a second image portion of the multiple selectable image portions. For example, the multiple selectable image portions may be arranged such that the second image portion is adjacent the first image portion. It should also be noted that in some embodiment the second image portion may even be the same image portion as the first image portion. In this embodiment, the said selecting of the second image portion comprises performing a second operation to associate a second marking with the second image portion in an identifiable manner. It should be appreciated that the identifiable characteristic of the second marking with respect to the second image portion may be similar or the same as the identifiable characteristic of the first marking with respect to the first image portion. Alternatively, the identifiable characteristic of the second marking may be a derivative of the identifiable characteristic of the first marking. For example, if the first marking is a line extending in one direction with respect to the first image portion, the second marking may extend in the reverse direction with respect to the second image portion. The process may then generate information for use in authentication based on the first image portion, the second image portion and the respective markings associated with the first and second image portions. The generated information may characterize the first image portion, the second image portion and the markings of the first and second markings. The generated information may also characterize an order in which the first and second image portions are selected.

It should be appreciated that a particular number of selection iterations may be performed in order to satisfy a specified minimum entropy measure. For example, the authentication server 28 can be required to select a third image portion, a fourth image portion, etc, etc. The third and fourth markings should have identifiable characteristics with respect to their corresponding image portions that are based on the identifiable characteristic of the first marking with respect to the first image portion.

As discussed above, the steps of FIG. 3 are performed as part of a graphical password generation process in which the information characterizing the image portions and the associated markings are stored as at least a portion of a graphical password for controlling access to the protected resource. Thus, for example, the graphical password as generated is stored under the control of the authentication server 28 and is suitable for use in future authentication operations. The user is also of course notified of the generated password such that the user can enter the password at the user device 22.

Once the user enters the graphical password, operations are performed as part of a graphical password verification process utilizing the verification module 118 of the authentication server 28. As part of this verification process, the information characterizing the images and the associated markings as recreated from user input are compared to at least a portion of the previously-stored graphical password for controlling access to the protected resource.

Figure 3:
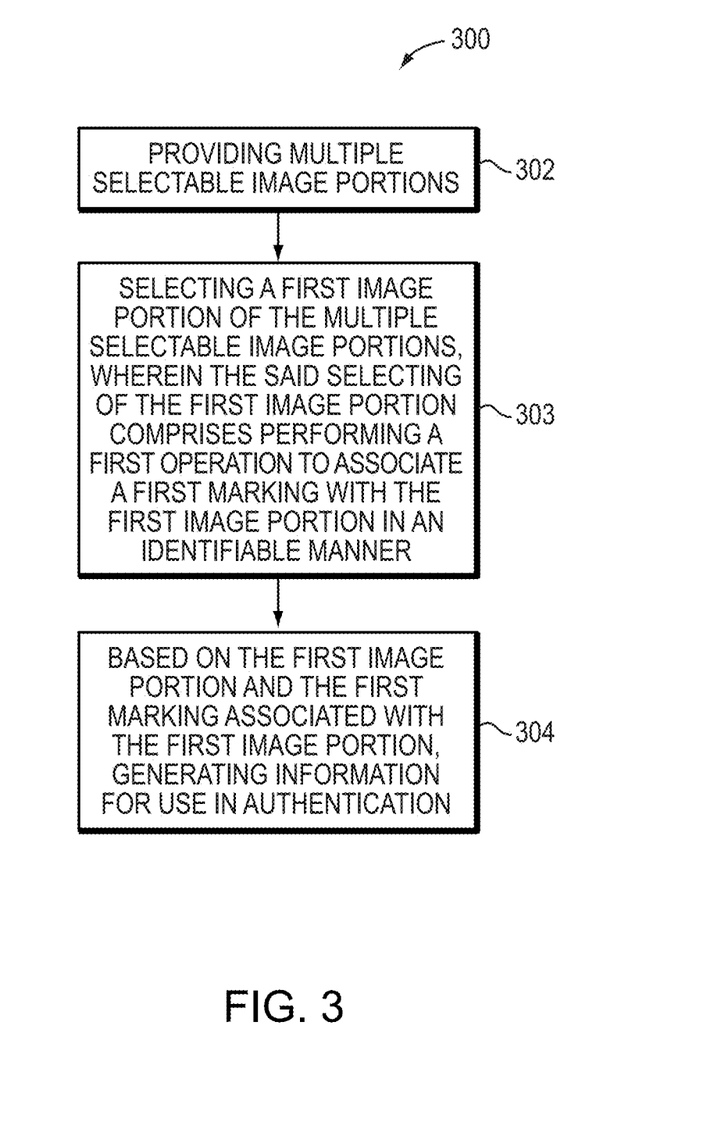
FIG. 3 is a flow diagram of an exemplary process utilized in the environment of FIG. 1.

The particular processing operations and other system functionality described in conjunction with the flow diagram of FIG. 3 are presented by way of illustrative example only, and should not be construed as limiting the scope of the invention in any way. Alternative embodiments can use other types of processing operations. For example, the ordering of the process steps may be varied in other embodiments, or certain steps may be performed concurrently with one another rather than serially. Also, the process steps may be repeated periodically in conjunction with respective distinct graphical password generation instances.

Additional details relating to illustrative embodiments of the invention will now be described with reference to FIG. 4.

Figure 4:
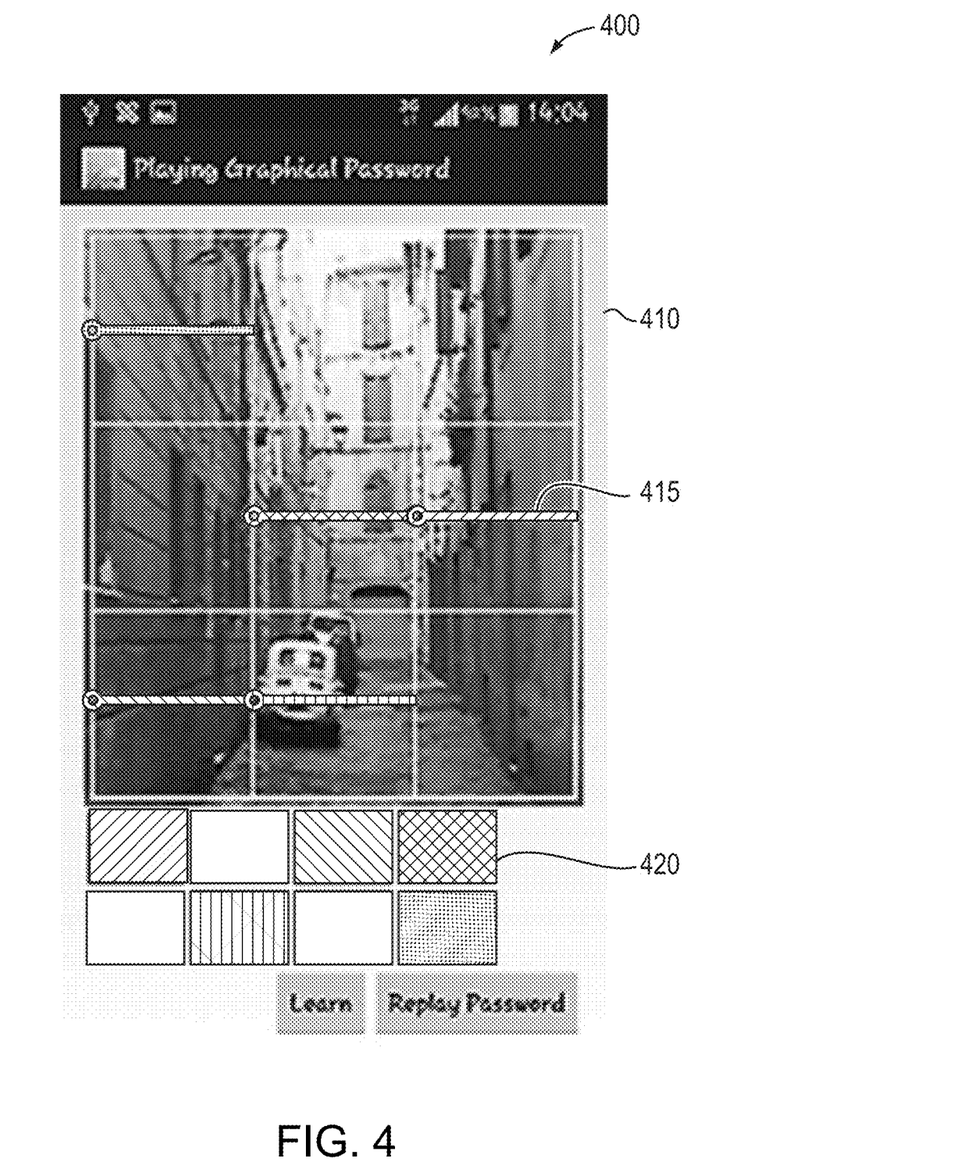
FIG. 4 shows an exemplary display illustrating authentication information in the form of a graphical password that is generated in the environment of FIG. 1.

FIG. 4 shows a display 400 illustrating authentication information in the form of a graphical password that is generated by the authentication server 28. In this embodiment, the display 400 is displayed to the user such that the user can learn the graphical password. It should be appreciated that the display 400 may present to the user an image or a video of the graphical password. For example, if an image is presented then the graphical password will be shown to the user to learn and remember the graphical password as statically presented to the user. On the other hand, if a video is presented, the order of certain actions may also be relevant. The graphical password in both scenarios is presented to the user to facilitate access by the user to a protected resource. If the user correctly remembers the password then access will be granted. If the user incorrectly remembers the password then access is denied.

It should be understood that the display 400 as illustrated comprises a base image 410 covered by a grid like structure that divides the base image 410 into a plurality of image portions. The display 400 also comprises five markings in the form of lines, each line extending perpendicularly between parallel sides of corresponding image portions. In this particular embodiment, a first marking 415 extends perpendicularly between parallel sides of a first image portion. The other four markings also each extend perpendicularly between parallel sides of corresponding image portions. Each of these four markings comprises similar identifiable characteristics with respect to their corresponding image portions as the identifiable characteristics of the first marking with respect to the first image portion. For example, the four markings extend perpendicularly between parallel sides of their corresponding image portions similar to that of the first marking. It should be appreciated that the markings may also have other identifiable characteristics, such as, colors/patterns 420 associated therewith.

As discussed above, the first marking 415 and the four subsequent markings extend perpendicularly between parallel sides of their corresponding image portions. It will be appreciated that this is one embodiment only. In another embodiment, the four subsequent markings may not all extend in the same direction as the first marking, but the direction of any of the four markings may be a derivative of the direction or orientation of the first marking. For example, if the first marking extends perpendicularly from left to right, then any of the subsequent markings may extend from top to bottom between parallel sides of the corresponding image portions.

In a further embodiment, the subsequent markings may be restricted to the image portion selected for the first marking. For example, the subsequent markings may all be in the same grid cell of the grid-like structure of image portions, and the subsequent markings may have the same characteristics as the first marking (same color). Alternatively, the subsequent markings may be restricted to a subset of grid cells near the first marking. Alternatively, the subsequent markings may be restricted to grid cells adjacent the first randomly chosen grid cell. The markings associated with the restricted grid cells may also be limited to a color in order to provide a greater number of possible password simplification techniques.

While various embodiments of the invention have been particularly shown and described, it will be understood by those skilled in the art that various changes in form and details may be made therein without departing from the spirit and scope of the invention as defined by the appended claims.

What is claimed is:

1. A method, comprising:
    providing, by processing circuitry, a base image and a set of gridlines rendered over the base image to divide the base image into multiple selectable image portions;
    performing, by processing circuitry, a first operation that associates a coloured first marking with a first image portion of the multiple selectable image portions, wherein performing the first operation comprises selecting the first image portion and inserting the coloured first marking in the first image portion such that the coloured first marking extends in a first direction between two end points in the first image portion, wherein the coloured first marking comprises one of a line, a symbol and a pattern;
    in response to performing the first operation, restricting, by processing circuitry, a second operation, to be performed after the first operation, that associates a coloured second marking with a second image portion, wherein the second operation is restricted by the first operation with respect to a number of the image portions that are selectable and the colour of the second marking;
    performing, by processing circuitry, a second operation that associates a coloured second marking with a second image portion of the multiple selectable image portions, wherein performing the second operation comprises selecting the second image portion and inserting the coloured second marking in the second image portion such that the coloured second marking extends in a second direction between two end points in the second image portion, wherein the coloured second marking comprises one of a line, a symbol and a pattern, wherein the coloured second marking is the same colour as the coloured first marking, and wherein the coloured second marking extends in the same direction as the coloured first marking;
    generating, by processing circuitry, a graphical password, wherein the graphical password is dependent on the coloured first marking extending in the first direction between two end points in the first image portion, wherein the graphical password is dependent on the coloured second marking extending in the second direction between two end points in the second image portion, wherein the graphical password is dependent on the colour of the coloured first and second markings being the same, wherein the graphical password is dependent on coloured first and second markings extending in the same direction, and wherein the graphical password is dependent on the order of the first and second operations; and
    based on the graphical password, controlling, by processing circuitry, access to a computerized resource.

2. The method as claimed in claim 1, wherein performing the first operation to associate the coloured first marking with the first image portion comprises positioning the coloured first marking such that the coloured first marking extends in a defined direction with respect to the first image portion.

3. The method as claimed in claim 1, wherein performing the first operation to associate the coloured first marking with the first image portion comprises positioning the coloured first marking such that the coloured first marking is positioned in a defined area with respect to the first image portion.

4. The method as claimed in claim 1, wherein the second marking is associated with the image portion in a manner that is identifiably similar to the manner in which the first marking is associated with the first image portion.

5. The method as claimed in claim 1, wherein the second marking is associated with the image portion in a manner that is identifiably the same as the manner in which the first marking is associated with the first image portion.

6. The method as claimed in claim 1, wherein the multiple selectable image portions are arranged such that the image portion including the second marking is located adjacent the first image portion.

7. The method as claimed in claim 1, wherein the multiple selectable image portions are arranged such that the first and second markings are included in the same image portion.

8. An apparatus, comprising:
memory; and
processing circuitry coupled to the memory, the memory storing program code which, when executed by the processing circuitry, cause the processing circuitry to:
provide a base image and a set of gridlines rendered over the base image to divide the base image into multiple selectable image portions;
perform a first operation that associates a coloured first marking with a first image portion of the multiple selectable image portions, wherein performing the first operation comprises selecting the first image portion and inserting the coloured first marking in the first image portion such that the coloured first marking extends in a first direction between two end points in the first image portion, wherein the coloured first marking comprises one of a line, a symbol and a pattern;
in response to performing the first operation, restricting, by processing circuitry, a second operation, to be performed after the first operation, that associates a coloured second marking with a second image portion, wherein the second operation is restricted by the first operation with respect to a number of the image portions that are selectable and the colour of the second marking;
perform a second operation that associates a coloured second marking with a second image portion of the multiple selectable image portions, wherein performing the second operation comprises selecting the second image portion and inserting the coloured second marking in the second image portion such that the coloured second marking extends in a second direction between two end points in the second image portion, wherein the coloured second marking comprises one of a line, a symbol and a pattern, wherein the coloured second marking is the same colour as the coloured first marking, and wherein the coloured second marking extends in the same direction as the coloured first marking; generate a graphical password, wherein the graphical password is dependent on the coloured first marking extending in the first direction between two end points in the first image portion, wherein the graphical password is dependent on the coloured second marking extending in the second direction between two end points in the second image portion, wherein the graphical password is dependent on the colour of the coloured first and second markings being the same, wherein the graphical password is dependent on coloured first and second markings extending in the same direction, and wherein the graphical password is dependent on the order of the first and second operations; and
based on the graphical password, control access to a computerized resource.

9. A computer program product having a non-transitory computer-readable medium storing instructions, the instructions, when carried out by processing circuitry, causing the processing circuitry to perform a method of:
providing a base image and a set of gridlines rendered over the base image to divide the base image into multiple selectable image portions;
performing a first operation that associates a coloured first marking with a first image portion of the multiple selectable image portions, wherein performing the first operation comprises selecting the first image portion and inserting the coloured first marking in the first image portion such that the coloured first marking extends in a first direction between two end points in the first image portion, wherein the coloured first marking comprises one of a line, a symbol and a pattern;
in response to performing the first operation, restricting, by processing circuitry, a second operation, to be performed after the first operation, that associates a coloured second marking with a second image portion, wherein the second operation is restricted by the first operation with respect to a number of the image portions that are selectable and the colour of the second marking;
performing a second operation that associates a coloured second marking with a second image portion of the multiple selectable image portions, wherein performing the second operation comprises selecting the second image portion and inserting the coloured second marking in the second image portion such that the coloured second marking extends in a second direction between two end points in the second image portion, wherein the coloured second marking comprises one of a line, a symbol and a pattern, wherein the coloured second marking is the same colour as the coloured first marking, and wherein the coloured second marking extends in the same direction as the coloured first marking;
generating a graphical password, wherein the graphical password is dependent on the coloured first marking extending in the first direction between two end points in the first image portion, wherein the graphical password is dependent on the coloured second marking extending in the second direction between two end points in the second image portion, wherein the graphical password is dependent on the colour of the coloured first and second markings being the same, wherein the graphical password is dependent on coloured first and second markings extending in the same direction, and wherein the graphical password is dependent on the order of the first and second operations; and
based on the graphical password, controlling access to a computerized resource.

* * * * *